United States Patent [19]

Cloutier et al.

[11] Patent Number: 4,811,042
[45] Date of Patent: Mar. 7, 1989

[54] METHOD AND APPARATUS FOR RECORDING AND USING EXPOSURE DATA IN A PHOTOGRAPHIC SYSTEM

[75] Inventors: Robert P. Cloutier, Spencerport; Roger A. Fields, Pittsford, both of N.Y.

[73] Assignee: Eastman Kodak Company, Rochester, N.Y.

[21] Appl. No.: 185,667

[22] Filed: Apr. 25, 1988

[51] Int. Cl.$^4$ ............... G03B 7/00; G03B 17/24
[52] U.S. Cl. ....................... 354/410; 354/105; 354/106; 352/236
[58] Field of Search ............... 354/410, 412, 458, 105, 354/106, 109, 21; 352/236

[56] References Cited

U.S. PATENT DOCUMENTS

| | | | |
|---|---|---|---|
| 3,736,849 | 6/1973 | Thompson | 95/1.1 |
| 3,762,285 | 10/1973 | Tenkumo | 354/458 |
| 3,843,956 | 10/1974 | Kauneckas | 354/108 |
| 3,968,501 | 7/1976 | Kauneckas | 354/106 |
| 3,995,289 | 11/1976 | Shono | 354/109 |
| 4,001,846 | 1/1977 | Kauneckas | 354/105 |
| 4,025,931 | 5/1977 | Taguchi et al. | 354/105 |
| 4,340,286 | 7/1982 | Carr | 354/105 |
| 4,363,541 | 12/1982 | Aihara et al. | 354/458 |
| 4,684,229 | 8/1987 | Utsugi | 354/106 |
| 4,734,727 | 3/1988 | Takemae | 354/412 |

*Primary Examiner*—Russell E. Adams
*Attorney, Agent, or Firm*—Jeffrey L. Brandt

[57] ABSTRACT

A method of operating a photographic camera to provide exposure information in association with a latent image picture frame includes the step of automatically providing a nominal exposure for the picture frame. An operator-selected exposure is provided for the picture frame which differs from the nominal exposure by a known under- or over-exposure. The picture frame is exposed in accordance with the operator-selected exposure, and data is recorded in association with the picture frame indicating the difference between the nominal and operator-selected exposures. A method of operating a photographic printing system is provided, responsive to the recorded data, for marking a photographic print to indicate to an observer the under- or over-exposure of the negative. A method of operating a transparency processing system is provided wherein, responsive to the recorded data, the slide mount is marked with the under- or over-exposure.

24 Claims, 4 Drawing Sheets

METHOD AND APPARATUS FOR RECORDING AND USING EXPOSURE DATA IN A PHOTOGRAPHIC SYSTEM

The present invention relates generally to the recording of exposure data in association with photographs, and more specifically to recording data describing intentional variations from a nominal exposure for providing information to an observer.

BACKGROUND OF THE INVENTION

It is known in the art to record aperture and shutter speed information in relation to photographic pictures. U.S. Pat. Nos. 3,843,956 and 4,001,846 to Kauneckas show electronic apparatus for recording such information directly on a film, while U.S. Pat. Nos. 3,995,289 to Shono and 3,736,849 to Thompson show opto-mechanical apparatus for doing the same. Further, at least one camera manufacturer makes available a data-back for a camera, including an alpha-numeric keyboard, which permits exposure data in combination with operator-selected messages to be recorded in relation to an exposed film.

A disadvantage of prior art cameras is that, in instances wherein a user intentionally varies a camera exposure from a suggested nominal exposure, no accommodation is made for recording the varied exposure. Such instances arise, for example, in cameras of the type providing both a recommended nominal exposure, and the ability to deviate from the nominal exposure for such purposes as exposure bracketing. Since no accommodation is made for recording the varied exposure, this information is not available to the subsequent observer of the finished photographic prints or transparencies. Thus, in situations where the user has intentionally varied an exposure, he is typically left guessing what exposure was used for a subsequently finished print or transparency.

SUMMARY OF THE INVENTION

Accordingly, a principle object of the present invention is to provide information indicating an intentional variation from a nominal exposure for use during the evaluation of photographic prints or transparencies.

Another object of the present invention is to provide a photographic camera which automatically records exposure data indicating an intentional variation from a nominal exposure.

A further object of the present invention is to provide a system for processing and mounting a transparency which indicates on the mounted transparency if the exposure selected for the transparency was intentionally varied from a nominal exposure.

Yet another object of the present invention is to provide a photographic printing system for printing a photographic negative onto a photosensitive paper which indicates on the photographic print if the exposure selected for the negative was intentionally varied from a nominal exposure.

In accordance with a first embodiment of the present invention, a new and improved method of operating a photographic camera to provide exposure information in association with a latent image picture frame comprises the steps of:

automatically providing a nominal exposure for the picture frame;

providing an operator-selected exposure for the picture frame which differs from the nominal exposure by a known under- or over-exposure;

exposing the picture frame in accordance with the operator-selected exposure; and recording data in association with the picture frame which indicates the difference between the nominal and operator-selected exposures.

In another embodiment of the present invention, a new and improved method of providing exposure-related data in association with a mounted photographic transparency comprises the steps of:

reading data associated with the photographic transparency, the data indicating if the transparency was purposefully exposed at an operator-selected exposure different from an automatically supplied nominal exposure; and recording data in association with the mounted photographic transparency indicating to an observer the under- or over-exposure of the transparency.

In yet another embodiment of the present invention, a new and improved method of operating a photographic printing system to print a photographic negative onto a photosensitive paper, whereby to produce a subsequently developed photographic print, comprises the steps of:

reading data associated with the negative, the data indicating if the negative was purposely exposed at an operator-selected exposure different from an automatically supplied nominal exposure; and marking the photographic print to indicate to an observer the under- or over-exposure of the negative.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing Figures, in which:

DETAILED DESCRIPTION OF THE INVENTION

Figure 1:
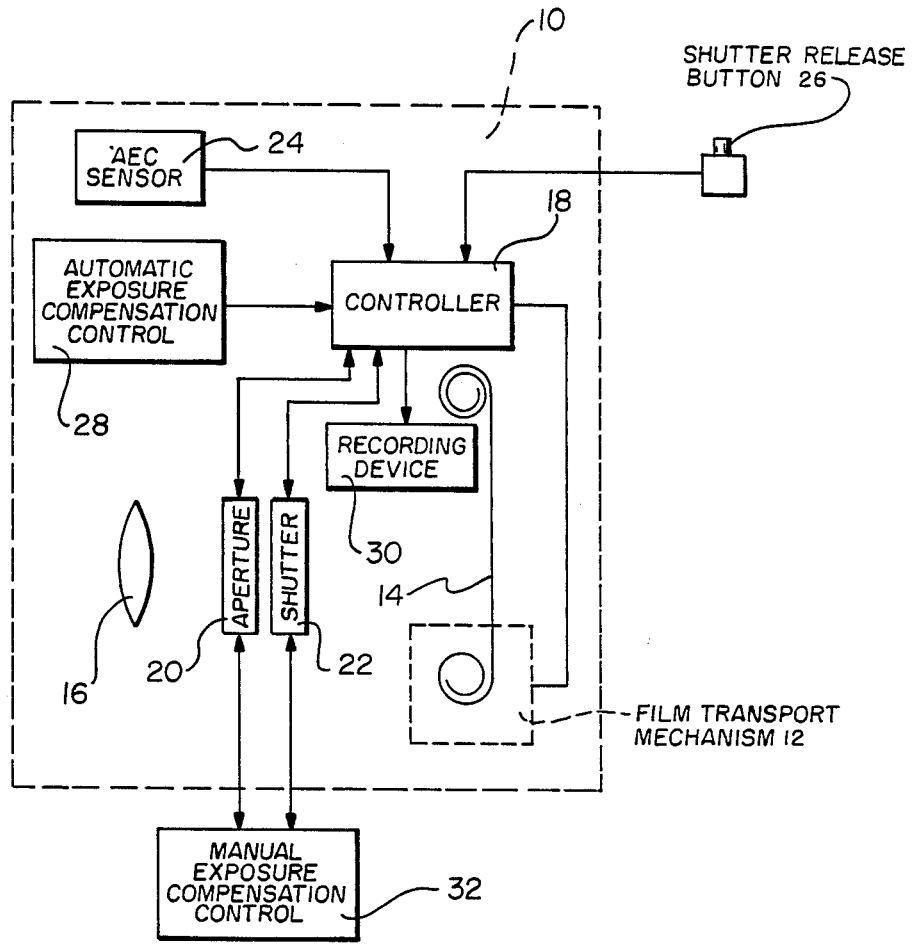
FIG. 1 is a block diagram of a photographic camera constructed in accordance with the present invention.

Referring now to the drawings, FIG. 1 shows a photographic camera 10 including a transport mechanism 12 for supporting and advancing a conventional silver halide filmstrip 14. A lens 16, aperture mechanism 20, and shutter mechanism 22 are positioned to control the exposure of picture frames onto filmstrip 14. As used herein, a "picture frame" comprises an undeveloped, latent image scene. A controller 18, for example a microprocessor, is connected to the aperture and shutter mechanisms 20, 22, and to film transport mechanism 12. An automatic exposure control photosensor 24 and a shutter release button 26 are both connected to controller 18, operation of the shutter release button causing the controller to set aperture 20 and actuate shutter 22.

The above-described components represent conventional features and will not be discussed in detail herein.

In accordance with the present invention, an automatic exposure compensation control mechanism 28 is connected to controller 18. A recording device 30 is likewise connected to controller 18 and positioned adjacent filmstrip 14 for marking the filmstrip. A manual exposure compensation control mechanism 32 includes controls such as thumbwheels (not shown) mounted on the outside of camera 10, the operation of which varies the adjustment of aperture 20 and shutter 22.

Automatic exposure compensation control mechanism 28 comprises apparatus for automatically "bracketing" a nominal exposure selected by controller 18 responsive to the light sensed by sensor 24. Mechanism 28 functions to automatically provide a selected number of exposures in addition to the nominal exposure: i.e. one under- and one over-exposure. The amount of under- and over-exposure can be pre-programmed, or controlled by a photographer. Alternatively, exposure compensation control mechanism 28 can be operated to provide a predetermined under- or over-exposure for selected frames, without the above-described bracketing. Such operation is desirable, for example, to provide purposeful over-exposure to compensate for back-lit scenes.

Recording device 30 comprises apparatus for recording data onto filmstrip 14 in, for example, a latent image, mechanical, or magnetic format. If latent image recording is desired, recording device 30 can comprise a light pipe or light emitting diode (LED). If mechanical recording is desired, device 30 can comprise a mechanical punch. Similarly, if part of filmstrip 14 is adapted for magnetic recording, recording device 30 can comprise a magnetic write head.

Manual compensation control mechansim 32 comprises apparatus for permitting an operator (not shown) to manually override the nominal exposure automatically supplied by controller 18, and to manually adjust aperture 20 and/or shutter 22 to provide a user-selected exposure. Manual compensation control mechanism 32 can comprise, for example, user-operable thumbwheels appropriately connected to aperture and shutter mechanisms 20, 22.

Figure 2:
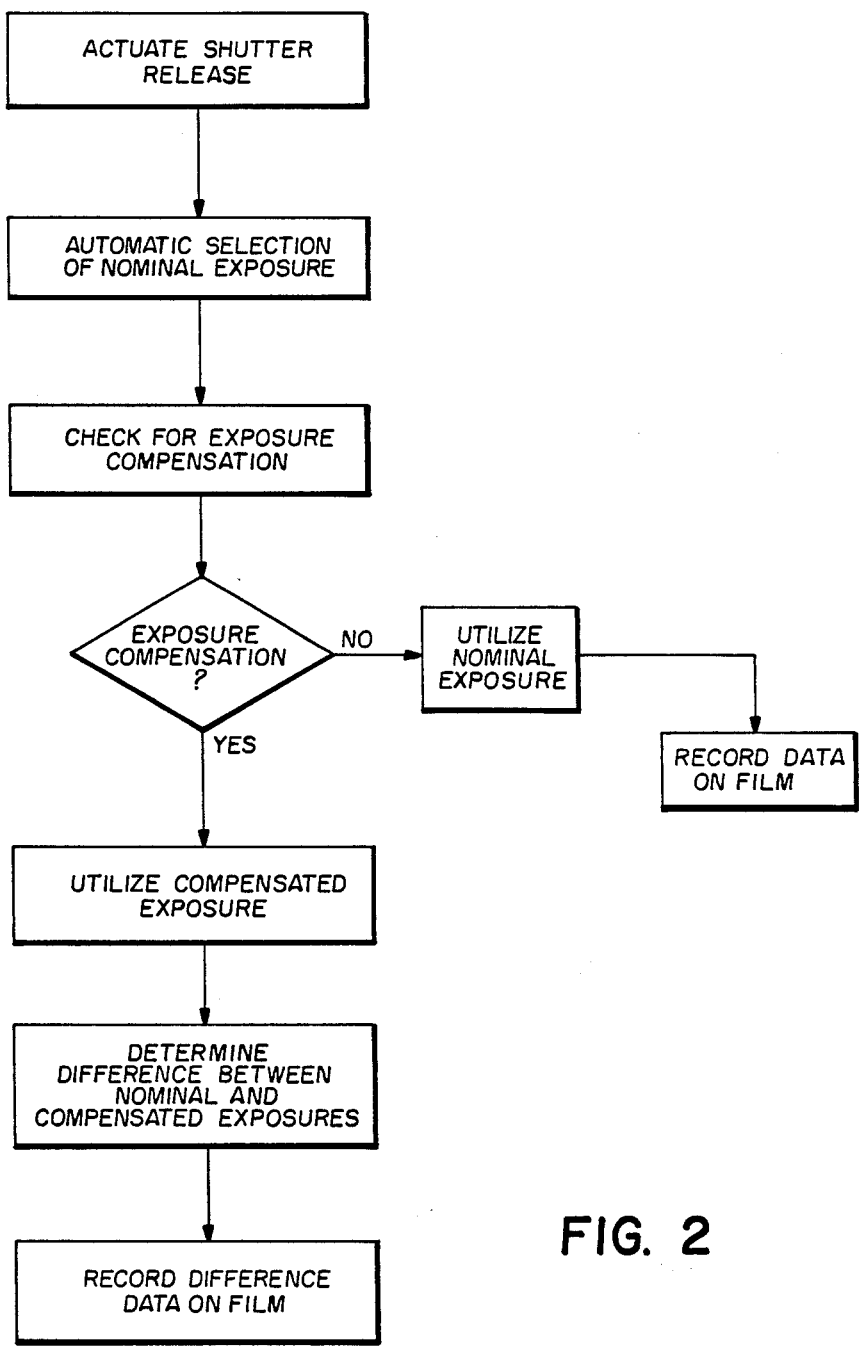
FIG. 2 is a flow chart illustrating the operation of the camera of FIG. 1.

In operation, described with respect to the flow chart of FIG. 2, upon the activation of shutter release button 26 by a user, controller 18 functions to automatically provide a nominal exposure for filmstrip 14. This nominal exposure is selected responsive to the ambient light sensed by sensor 24, and the selective activation of a flash (not shown). The providing of such pre-programmed or calculated nominal exposures is well known to those skilled in the art, and will not be discussed further herein.

Next, controller 18 senses the input of automatic exposure compensation control 28 and manual exposure compensation control 32 to determine if the user has manipulated either control to select an exposure other than the automatically provided nominal exposure. If no exposure compensation is provided, the filmstrip 14 is exposed with the nominal exposure. Recording device 30 is then activated to record on filmstrip 14 data indicating that the nominal exposure was used. Alternatively, the absence of data could be used to indicate the nominal exposure was used.

If controller 18 determines that exposure compensation has been provided, either through automatic controller 28 or manual controller 32, aperture 20 and shutter 22 are set to provide the desired, user-selected exposure to filmstrip 14. Controller 18 calculates/determines the difference between the automatically provided nominal exposure and the user-selected exposure. Such a difference is typically expressed in "stops", for example one change in f-stop, or a halving (or doubling) of shutter speed. The user-selected exposure is made on filmstrip 14, and controller 18 activates recording device 30 to record data indicating the difference between the nominal and user-selected exposures on the filmstrip. If automatic exposure bracketing is selected as described above, the compensated exposure and concomitant data recording will, of course, be performed for each of the bracketing exposures.

The present invention has particular application with respect to the analysis of photographic transparencies. As is known in the art, transparency film is particularly sensitive to deviations from the nominal exposure. Further, because no printing process is used wherein deviations in exposure can be corrected, any exposure compensation provided by a camera will be very apparent upon viewing the transparencies.

Figure 3:
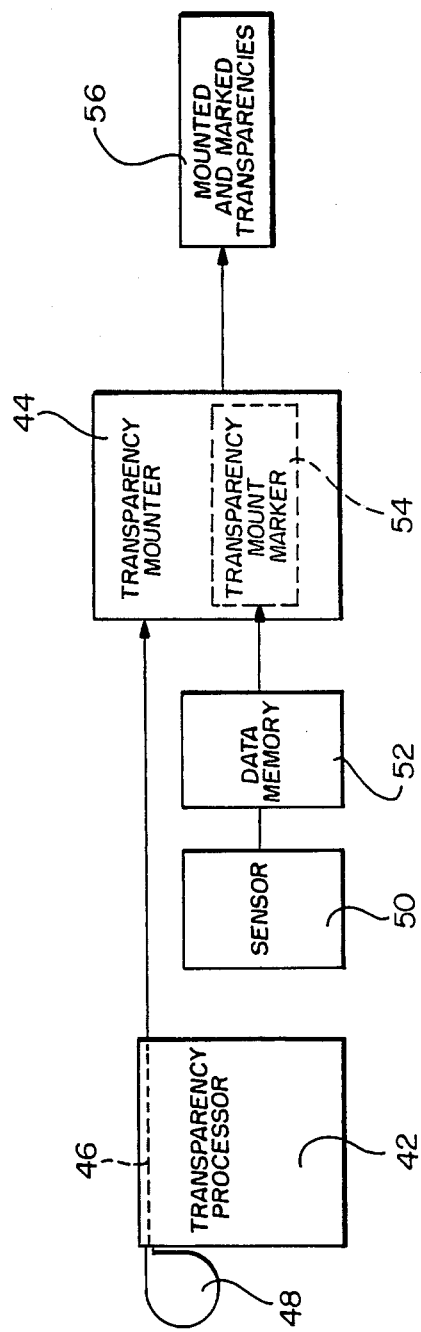
FIG. 3 is a block diagram of a photographic slide mounter constructed in accordance with the present invention.

Referring now to FIG. 3, a transparency processing system 40 constructed in accordance with the present invention includes conventional processing and mounting stations, 42, 44, respectively. A transparency film 46 is removed from a light tight cartridge 48, and moved seriatim through processor 42 and mounter 44.

In accordance with the present invention, a sensor 50 is provided upstream (i.e. before cutting and mounting) of mounter 44. A data memory circuit 52 is provided intermediate sensor 50 and transparency mounter 44. A transparency mount marker, for example an ink marker, is provided in mounter 44.

In operation, sensor 50 senses the exposure compensation data recorded with each image frame on filmstrip 46, and transmits this data to mounter 44 via memory 52. Data memory 52 insures that the correct data is synchronized with its corresponding image frame as the image frames are cut and mounted by mounter 44. Transparency mount marker 54 is actuated, responsive to the exposure data, to mark the data in human-readable format on the transparency mount. Thus, a viewer can view the mounted and marked transparencies indicated at 56, and determine if an exposure compensation was provided when the image was exposed. Transparency mount marker 54 can optionally be actuated to mark the data in a machine-readable format on the transparency mount, thus accommodating automated display of the exposure compensation information.

The invention has further application in a photographic printer. More specifically, the data recorded with each exposure can be used to mark the subsequently made print, thus informing the photographer of any intentional variation in exposure.

Figure 4:
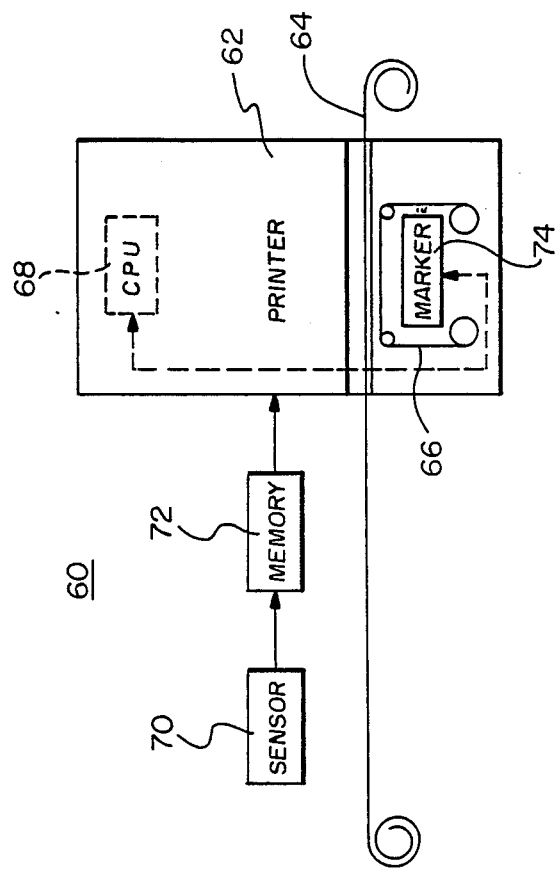
FIG. 4 is a block diagram of a photographic printing system constructed in accordance with the present invention.

Referring now to FIG. 4, a photographic printing system 60 is shown constructed in accordance with the present invention. System 60 includes a printer 62 for printing consecutive, developed negative frames on a filmstrip 64 onto photographic paper 66. A controller 68 such as a central processing unit (CPU) is provided for controlling printer 62, including providing/calculating a nominal printing exposure for printing each negative frame.

In accordance with the present invention, a sensor 70 is positioned adjacent filmstrip 64 and upstream of printer 62 for sensing exposure data of the type described herein above. A data memory 72 is provided intermediate sensor 70 and printer 62. Alternatively, sensor 70 can be positioned at the print station in printer 62, negating the need for memory 72. A marker 74, for example an ink printer, is provided in printer 62 for marking the back (i.e. non-emulsion) side of photographic paper 66 in accordance with the sensed exposure data.

In operation, sensor 70 functions to sense the exposure data recorded with each negative frame on filmstrip 64. The sensed exposure data is transmitted to printer 62 via memory 72, the memory insuring the synchronizing of the data with its' corresponding negative frame. Photographic print marker 74 is actuated, responsive to the exposure data, to mark the data in human-readable format on the back of the print. Thus, a viewer/photographer can view the subsequently developed, marked prints and determine if an exposure compensation was provided when the image was exposed. Photographic print marker 74 can optionally be actuated to expose the data directly onto the emulsion side of the photographic print, for example along an edge.

There is thus provided a method and apparatus for associating data indicating user-provided exposure compensations with each latent image exposed in a camera. Further provided are methods and apparatus for using this exposure compensation data to advantage in viewing subsequently produced photographic prints and transparencies. More specifically, a transparency processing and mounting system is provided for marking the exposure data directly on the transparency mount, permitting a viewer to appreciate the results of his exposure selection. A photographic printing system is likewise provided for marking the exposure data on prints. There are thus provided convenient, automatic systems for marking prints or transparencies so as to later remind the user of the exposure compensation provided.

While preferred embodiments of the invention have been illustrated and described, it will be clear that the invention is not so limited. Numerous modifications, changes, variations, substitutions and equivalents will occur to those skilled in the art without departing from the spitit and scope of the present invention.

What is claimed is:

1. A method of operating a photographic camera to provide exposure information in association with a latent image picture frame, comprising the steps of:
   automatically providing a nominal exposure for said picture frame;
   providing an operator-selected exposure for said picture frame which differs from said nominal exposure by a known under- or over-exposure;
   exposing said picture frame in accordance with said operator-selected exposure; and
   recording data in association with said picture frame which indicates the difference between said nominal and operator-selected exposures.

2. The method of claim 1 and further comprising the step of automatically calculating the difference between said nominal and operator-selected exposures.

3. The method of claim 1 wherein said recording step includes the step of automatically recording said data responsive to the forming of said picture frame.

4. The method of claim 1 wherein said recording step includes recording data on the same film medium as said picture frame.

5. The method of claim 4 wherein said recording step includes recording a latent image on said photographic film.

6. The method of claim 4 wherein said recording step includes recording magnetically coded data on said photographic film.

7. The method of claim 4 wherein said recording step includes mechanically coding data onto said photographic film.

8. A photographic camera for providing exposure information in association with a latent image picture frame, comprising:
   means for automatically providing a nominal exposure for said picture frame;
   means for providing an operator-selected exposure for said picture frame which differs from said nominal exposure by a known under- or over-exposure;
   means for exposing said picture frame in accordance with said operator-selected exposure; and
   means for automatically recording data in association with said picture frame which indicates the difference between said nominal and operator-selected exposures.

9. A camera in accordance with claim 8 and further comprising means for automatically calculating the difference between said nominal and operator-selected exposures.

10. A camera in accordance with claim 8 wherein said recording means includes means for recording data on the same film base as said picture frame.

11. A camera in accordance with claim 10 wherein said recording means includes means for recording a latent image on said photographic film.

12. A camera in accordance with claim 10 wherein said recording means includes means for recording magnetically coded data on said photographic film.

13. A camera in accordance with claim 10 wherein said recording means includes means for mechanically coding data onto said photographic film.

14. A method of operating a photographic printing system to print a photographic negative onto a photosensitive paper whereby to produce a subsequently developed photograpic print, said method comprising the steps of:
   reading data associated with said negative, said data indicating if said negative was purposely exposed at an operator-selected exposure different from an automatically supplied nominal exposure; and
   marking said photographic print to indicate to an observe the under- or over-exposure of said negative.

15. The method of claim 14 wherein said reading step includes the step of automatically sensing said data at a location upstream of the printing station in said photographic printing system.

16. A photographic printing system for printing a photographic negative onto a photosensitive paper whereby to produce a subsequently developed photographic print, said system comprising:
   means for reading data associated with said negative, said data indicating if said negative was purposely exposed at an operator-selected exposure different from an automatically supplied nominal exposure; and
   means for marking said photographic print to indicate to an observer the under- or over-exposure of said negative.

17. The system of claim 16 wherein said reading means includes a sensor disposed upstream of the printing station in said photographic printing system.

18. A method of providing exposure-related data in association with a mounted photographic transparency comprising the steps of:
   reading data associated with said photographic transparency, said data indicating if said transparency was exposed at an operator-selected exposure different from an automatically supplied nominal exposure; and
   recording data in association with said mounted photographic transparency indicating to an observer the under- or over-exposure of said transparency.

19. The method of claim 18 wherein said recording step includes the step of marking the transparency mount.

20. The method of claim 18 wherein said reading step includes the step of automatically sensing said data before said transparency is mounted.

21. A transparency processor and mounter for providing exposure-related data in association with a mounted photographic transparency comprising:
   means for reading data associated with said photographic transparency, said data indicating if said transparency was exposed at an operator-selected exposure different from an automatically supplied nominal exposure; and
   means for recording data in association with said mounted photographic transparency indicating to an observer the under- or over-exposure of said transparency.

22. Apparatus in accordance with claim 21 wherein said recording means includes means for marking the transparency mount.

23. Apparatus in accordance with claim 21 wherein said reading means includes a sensor positioned upstream of the mounter in said transparency processor and mounter.

24. In an exposed photographic film of the type responsive to light exposure from a picture scene for producing a developable silver halide latent image of said picture scene, the improvement comprising:
   data recorded on said photographic film automatically and in association with said latent image indicating if said latent image was exposed at an operator-selected exposure different from an automatically supplied nominal exposure.

* * * * *